United States Patent
Beach et al.

(10) Patent No.: US 7,804,876 B2
(45) Date of Patent: Sep. 28, 2010

(54) OPTICALLY PUMPED ALKALI LASER AND AMPLIFIER USING HELIUM-3 BUFFER GAS

(75) Inventors: Raymond J. Beach, Livermore, CA (US); Ralph Page, Castro Valley, CA (US); Thomas Soules, Livermore, CA (US); Eddy Stappaerts, San Ramon, CA (US); Sheldon Shao Quan Wu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 125 days.

(21) Appl. No.: 12/055,408

(22) Filed: Mar. 26, 2008

(65) Prior Publication Data
US 2008/0279228 A1    Nov. 13, 2008

Related U.S. Application Data

(60) Provisional application No. 60/920,359, filed on Mar. 26, 2007.

(51) Int. Cl.
H01S 3/22 (2006.01)
(52) U.S. Cl. .......................................... 372/56; 372/55
(58) Field of Classification Search ............. 372/55–56, 372/58–59
See application file for complete search history.

(56) References Cited

U.S. PATENT DOCUMENTS

| | | | |
|---|---|---|---|
| 6,331,993 | B1 | 12/2001 | Brown |
| 6,643,311 | B2 * | 11/2003 | Krupke .................. 372/56 |
| 6,693,942 | B2 | 2/2004 | Krupke |
| 7,061,958 | B2 | 6/2006 | Krupke |
| 7,061,960 | B2 | 6/2006 | Krupke |
| 7,082,148 | B2 | 7/2006 | Payne et al. |
| 7,283,576 | B2 * | 10/2007 | Krupke .................. 372/56 |
| 2003/0099272 | A1 | 5/2003 | Krupke |
| 2005/0190809 | A1 | 9/2005 | Petersen et al. |
| 2005/0206377 | A1 * | 9/2005 | Romalis et al. ......... 324/301 |
| 2006/0133431 | A1 | 6/2006 | Payne |
| 2007/0197366 | A1 * | 8/2007 | Aoki et al. ............... 501/11 |

(Continued)

OTHER PUBLICATIONS

Beach et al. "End-pumped continuous-wave alkali vapor lasers: experiment, model and power scaling" J Opt. Soc. Am. B, vol. 21 No. 12, Dec. 2004.

(Continued)

Primary Examiner—Minsun Harvey
Assistant Examiner—Phillip Nguyen
(74) Attorney, Agent, or Firm—John H. Lee; James S. Tak

(57) ABSTRACT

In one embodiment, a laser oscillator is provided comprising an optical cavity, the optical cavity including a gain medium including an alkali vapor and a buffer gas, the buffer gas including $^3$He gas, wherein if $^4$He gas is also present in the buffer gas, the ratio of the concentration of the $^3$He gas to the $^4$He gas is greater than $1.37 \times 10^{-6}$. Additionally, an optical excitation source is provided. Furthermore, the laser oscillator is capable of outputting radiation at a first frequency. In another embodiment, an apparatus is provided comprising a gain medium including an alkali vapor and a buffer gas including $^3$He gas, wherein if $^4$He gas is also present in the buffer gas, the ratio of the concentration of the $^3$He gas to the $^4$He gas is greater than $1.37 \times 10^{-6}$. Other embodiments are also disclosed.

23 Claims, 7 Drawing Sheets

U.S. PATENT DOCUMENTS

2007/0286324 A1*  12/2007  Hagelstein ................. 376/321
2008/0106261 A1*  5/2008  Romalis et al. ............. 324/304

OTHER PUBLICATIONS

Page et al. "Multimode-diode-pumped gas (alkali-vapor) laser" Optics Letters, vol. 31 No. 3, Feb. 2006.

Krupke et al. "Resonance transition 795-nm rubidium laser" Optics Letters, vol. 28 No. 23, Dec. 2003.

Wang et al. "Cesium vapor laser pumped by a volume-Bragg-grating coupled quasi-continuous-wave laser-diode array" Appl. Phys. Lett. 88 141112_2006.

Konefal. "Observation of collision induced processes in rubidium-ethane vapour" Optics Communications 164 (1999) 95-105.

Hrycyshyn et al. "Inelastic collisions between excited alkali atoms and molecules . . . " Can J Phys. 48, 2761, 1970.

Gallagher. "Rb and Cs Excitation Transfer in nearly Adiabatic Collisions with Inert Gases" Phys. Rev. 88, 172, 1968.

* cited by examiner

OPTICALLY PUMPED ALKALI LASER AND AMPLIFIER USING HELIUM-3 BUFFER GAS

RELATED APPLICATIONS

This application claims priority to provisional application Ser. No. 60/920,359 filed on Mar. 26, 2007.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to lasers, and more particularly to alkali lasers.

BACKGROUND

The use of alkalis as a gain element for lasers has been known for a number of years. Several years after the discovery of the laser an actual experimental demonstration of laser action in an alkali vapor occurred. However, since these early tests, there have been no convincing demonstrations of practical laser systems using alkalis.

Typically, alkali laser systems utilize the three lowest-lying electronic levels of the alkali atom for functionality. These levels include the $^2S_{1/2}$ ground electronic level, and the first two $^2P$ electronic levels, $^2P_{1/2}$, and $^2P_{3/2}$. These levels form a pure "three-level-laser" scheme.

In one particular alkali laser scheme, the alkali atom gain medium is excited (pumped) at a wavelength matching the wavelength of the $^2S_{1/2} \rightarrow {}^2P_{3/2}$ electric-dipole-allowed transition, also referred to as the $D_2$ transition. After kinetic relaxation of pump excitation from the $^2P_{3/2}$ level to the excited $^2P_{1/2}$ electronic level, laser emission takes place on the $^2P_{1/2} \rightarrow {}^2S_{1/2}$ transition, also referred to as the $D_1$ transition. These transition lines of the alkalis, known as the $D_1$ and $D_2$ lines, present textbook examples of fully allowed electric dipole transitions.

FIG. 1 shows the energy levels 100 involved in an optically pumped Rubidium (Rb) laser, in accordance with one alkali laser scheme. In this case, optical pumping on the alkali $D_2$ transition ($^2S_{1/2} \rightarrow {}^2P_{3/2}$) is followed by rapid relaxation from the $^2P_{3/2}$ to the $^2P_{1/2}$ level through collisions with a buffer gas, and then lasing on the $D_1$ transition ($^2P_{1/2} \rightarrow {}^2S_{1/2}$).

The problem with this scheme is the required rapid relaxation from the $^2P_{3/2}$ state to the $^2P_{1/2}$ state shown as the dotted line transition in FIG. 1 and commonly referred to as the fine-structure mixing transition. The rapid relaxation needed for the fine-structure mixing transition does not automatically occur in unperturbed alkali atoms. Thus, the buffer gas is typically utilized to facilitate such transition. Further, to enable laser action, the relaxation must occur very rapidly, such as on a time scale competitive with radiative transitions out of the $^2P_{3/2}$ and $^2P_{1/2}$ states.

Previously, it was proposed to use a small saturated hydrocarbon molecule, such as ethane, to rapidly mix via collisions with the alkali vapor the fine-structure states ($^2P_{3/2}$ and $^2P_{1/2}$). Such small saturated hydrocarbon molecules were known to have very large fine-structure mixing cross sections and very small excitation quenching cross sections. Following that proposal, several experimental verifications of the proposed lasing scheme were undertaken, in which ethane was used as the fine-structure mixing gas.

While this proposed scheme presented an interesting possibility for a new class of lasers, the use of organic molecules such as ethane to accomplish rapid fine-structure mixing is problematic due to the molecules decomposition and subsequent deposition of carbonaceous deposits in an optical cavity. In essence, the decomposition of the organic molecule can foul the optical surfaces of a laser cell, precluding the possibility of efficient and reliable laser operation.

There is thus a need for addressing these and/or other issues associated with the prior art.

SUMMARY

In one embodiment, a laser oscillator is provided comprising an optical cavity, the optical cavity including a gain medium including an alkali vapor and a buffer gas, the buffer gas including $^3He$ gas, wherein if $^4He$ gas is also present in the buffer gas, the ratio of the concentration of the $^3He$ gas to the $^4He$ gas is greater than $1.37 \times 10^{-6}$. Additionally, an optical excitation source is provided. Furthermore, the laser oscillator is capable of outputting radiation at a first frequency.

In another embodiment, an optical amplifier is provided comprising an optical cavity, the optical cavity including a gain medium including an alkali vapor and a buffer gas, the buffer gas including $^3He$ gas, wherein if $^4He$ gas is also present in the buffer gas, the ratio of the concentration of the $^3He$ gas to the $^4He$ gas is greater than $1.37 \times 10^{-6}$. Furthermore, the optical amplifier is capable of outputting radiation at a first frequency.

In another embodiment, an apparatus is provided comprising a gain medium including an alkali vapor and a buffer gas including $^3He$ gas, wherein if $^4He$ gas is also present in the buffer gas, the ratio of the concentration of the $^3He$ gas to the $^4He$ gas is greater than $1.37 \times 10^{-6}$.

In another embodiment, a method is provided. In operation, a gain medium including an alkali vapor is provided for an optical cavity. Additionally, a buffer gas including $^3He$ gas is provided for the optical cavity, wherein if $^4He$ gas is also present in the buffer gas, the ratio of the concentration of the $^3He$ gas to the $^4He$ gas is greater than $1.37 \times 10^{-6}$. Furthermore, an excitation source is provided for emitting pump radiation at a first wavelength for optically pumping the gain medium at a wavelength of a D2 transition of the alkali vapor to generate laser radiation emission output at a second wavelength.

Other aspects, advantages, and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of alkali laser and amplifier systems, as well as operation and/or component parts thereof.

Figure 2:
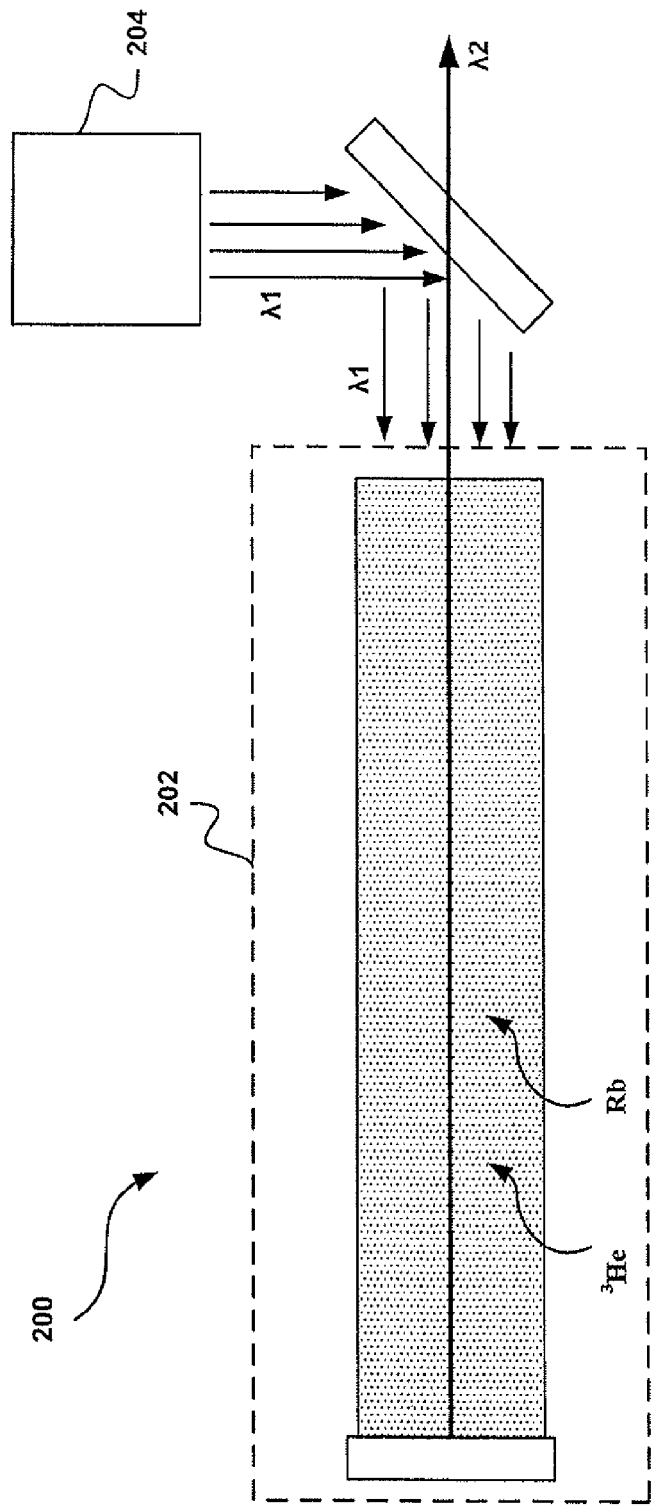
FIG. 2 shows a laser oscillator, in accordance with one embodiment.

FIG. 2 shows a laser oscillator 200, in accordance with one embodiment. As shown, the laser oscillator 200 includes an optical cavity 202. As shown further, the optical cavity 202 includes a gain medium comprising an alkali vapor and a buffer gas, the buffer gas including isotopically enriched helium-3 ($^3$He) gas. Furthermore, if helium-4 ($^4$He) gas is also present in the buffer gas, the ratio of the concentration of the $^3$He gas to the $^4$He gas is greater than $1.37 \times 10^{-6}$, which is the ratio of the concentration of $^3$He gas to $^4$He gas in naturally occurring He.

In the context of the present description, alkali vapor refers to any alkali metal or alkaline earth metal element in a vapor state. For example, in various embodiments, the alkali vapor may include, but is not limited to, cesium (Cs) vapor, Rubidium (Rb) vapor, Potassium (K) vapor, and/or any other alkali vapor that meets the above definition. Additionally, combinations of such materials may also be used.

Furthermore, isotopically enriched $^3$He refers to a non-radioactive isotope of helium with two protons and one neutron. In various embodiments, the buffer gas may include more than a certain percentage of isotopically enriched $^3$He (e.g. 1%, 10%, 50%, 90%, 99%, etc.), relative to a total He content of the buffer gas, and/or relative to all buffer gas present of any composition. In one embodiment, the buffer gas may consist of $^3$He gas of at least 99% chemical purity and/or at least 99% isotopic enrichment.

Additionally, an optical excitation source 204 is provided. As an option, the optical excitation source 204 may include a laser diode or laser diode array and a pump delivery device (e.g. a lens duct, etc.). Further, the optical excitation source 204 may include a source at resonance with a $D_2$ transition (i.e. a $^2S_{1/2} \rightarrow ^2P_{3/2}$ transition) of the alkali vapor.

In operation, the laser oscillator 200 is capable of outputting radiation at a first frequency, known as the natural frequency. In various embodiments, the natural frequency may be modified using various elements such that the radiation is output at a second frequency which is two, three, or four times the natural frequency.

In the laser oscillator 200, the alkali vapor gain medium may be pumped (optically excited) at a first wavelength matching the wavelength of the $^2S_{1/2} \rightarrow ^2P_{3/2}$ electric-dipole-allowed transition (i.e. the $D_2$ transition) of the alkali vapor. After kinetic relaxation of the pump excitation to the excited $^2P_{1/2}$ electronic level, laser emission may occur on the $^2P_{1/2} \rightarrow ^2S_{1/2}$ transition (i.e. the $D_1$ transition).

In one embodiment, pump radiation at a first wavelength associated with the $D_2$ transition of the alkali vapor, may be directed into a gain cell containing the alkali vapor and buffer gas. The alkali vapor and the buffer gas in the gain cell may be selectively pumped to the $^2P_{3/2}$ level, where the alkali vapor and the buffer gas mixture collisionally relaxes to the lower-lying $^2P_{1/2}$ level before the mixture decays back to a ground level. In this case, the $^3$He buffer gas may serve to collisionally broaden the alkali D-transitions. Furthermore, the $^3$He buffer gas may be utilized to increase a fine-structure mixing rate of the alkali and buffer gas, relative to a fine-structure mixing rate of the alkali and the buffer gas if naturally occurring He was used as the buffer gas in an otherwise identical system.

More illustrative information will now be set forth regarding various optional architectures and features with which the foregoing framework may or may not be implemented, per the desires of the designers or user. It should be strongly noted that the following information is set forth for illustrative purposes and should not be construed as limiting in any manner. Any of the following features may be optionally incorporated with or without the exclusion of other features described.

In some cases, Rb based Diode-Pumped Alkali Laser (DPAL) systems with sufficient fine-structure mixing may be developed with He alone if the He is present at sufficiently high pressure in the Rb vapor cell, thereby eliminating any contamination problems that would otherwise be introduced by using ethane or other organic molecules as a buffer gas. Table 1 shows fine-structure (F-S) mixing and excitation quenching cross sections for both Rb-ethane and Rb—He systems that have been reported in the scientific literature.

TABLE 1

| System | Transition | Cross Section Value |
|---|---|---|
| Rb—He | $5^2P_{1/2} \rightarrow 5^2P_{3/2}$ | $7.6 \times 10^{-18}$ cm$^2$ |
| F—S mixing | $5^2P_{3/2} \rightarrow 5^2P_{1/2}$ | $10.3 \times 10^{-18}$ cm$^2$ |
| Rb-ethane | $5^2P_{1/2} \rightarrow 5^2P_{3/2}$ | $5.7 \times 10^{-15}$ cm$^2$ |
| F—S mixing | $5^2P_{3/2} \rightarrow 5^2P_{1/2}$ | $7.7 \times 10^{-15}$ cm$^2$ |
| Rb—He quenching | $5^2P \rightarrow 5^2S$ | $1 \times 10^{-22}$ cm$^2$ |
| Rb-ethane quenching | $5^2P_{3/2} \rightarrow 5^2S_{1/2}$ | $6 \pm 3 \times 10^{-18}$ cm$^2$ |

Although the absolute values of the He fine-structure mixing cross sections are almost 1000 times smaller than those for ethane, the ratio of the fine-structure mixing to the quenching cross section is actually better for He than for ethane. For example, the difference of the He fine-structure mixing cross sections may be compensated by utilizing high He cell pressures. Furthermore, modeling analysis has shown that He pressures above 10 atm, but ideally closer to 25 atm would be required to optimize the efficiency of such Rb—He-neat systems.

Although, this represents a very plausible route to Rb based laser systems, several complications are introduced by the need for the high pressure He. Because the ratio of refractive index variation with temperature variation (dn/dT) of the laser gain medium is dominated by the presence of the He gas, it is advantageous to keep the pressure of the He gas as low as possible in the alkali cell. For example, higher He gas pressures and the resulting larger dn/dT's that accompany these higher pressures cause thermal aberrations introduced on the laser beam due to thermal gradients in the laser cell to be more pronounced.

By using isotopically enriched $^3$He gas for the He buffer gas, rather than a naturally-occurring mixture of He that comprises predominately $^4$He, the inventors have achieved many unexpected, unpredictable, and beneficial results. For example, the use of the lighter $^3$He atom surprisingly increases the fine-structure mixing rate at a given pressure, permitting lower buffer gas pressures in the alkali-containing vapor cell without compromising fine-structure mixing rates. This decrease in the buffer gas pressure from using $^3$He instead of naturally occurring He reduces the thermally-imprinted aberrations in the laser beam, enabling higher average power systems to be contemplated and achieved.

Another unexpected and unpredictable benefit from using isotopically enriched $^3$He buffer gas is that the $^3$He buffer gas has a higher thermal conductivity than naturally occurring He gas, due to the lower mass and higher thermal velocity of $^3$He gas atoms at a given temperature. This also favorably impacts the thermal management obstacles that must be addressed in the design and fabrication of a high-average-power laser.

In naturally occurring He, $^3$He is present at approximately one part in 740000. In other words, naturally occurring He consists of about 0.000137% $^3$He and about 99.999863% $^4$He. Without wishing to be bound by any theory, the unanticipated advantage of using isotopically enriched $^3$He appears to result from its lower mass and thus larger thermal velocity at a given temperature. Equation 1 shows the relationship between fine-structure mixing rate and thermally averaged relative velocity between He and Rb atoms.

$$\gamma_{^2P_{3/2} \to ^2P_{1/2}} = n_{He} \sigma_{^2P_{3/2} \to ^2P_{1/2}} v_r \qquad \text{Equation 1}$$

As shown in Equation 1, $$\gamma_{^2P_{3/2} \to ^2P_{1/2}}$$

is the fine-structure mixing rate (in the downward direction), $n_{He}$ is the He gas concentration, $$\sigma_{^2P_{3/2} \to ^2P_{1/2}}$$

is the fine-structure mixing cross section, and $v_r$ is the thermally-averaged relative velocity between He and Rb atoms illustrated in Equation 2 below.

$$v_r = \sqrt{3 k_B T \left( \frac{1}{m_{He}} + \frac{1}{m_{Rb}} \right)} \qquad \text{Equation 2}$$

With respect to Equation 1, the higher thermal velocity associated with $^3$He increases the reaction rate because of the $v_r$ dependence. At a fixed temperature, $v_r$ for $^3$He is about 1.15 times larger than that for $^4$He. In addition to the direct $v_r$ dependence in Equation 1, the fine-structure mixing cross section has a velocity dependence that may be estimated from the temperature dependent cross sections for He—Rb fine-structure mixing for naturally occurring He.

Figure 3:
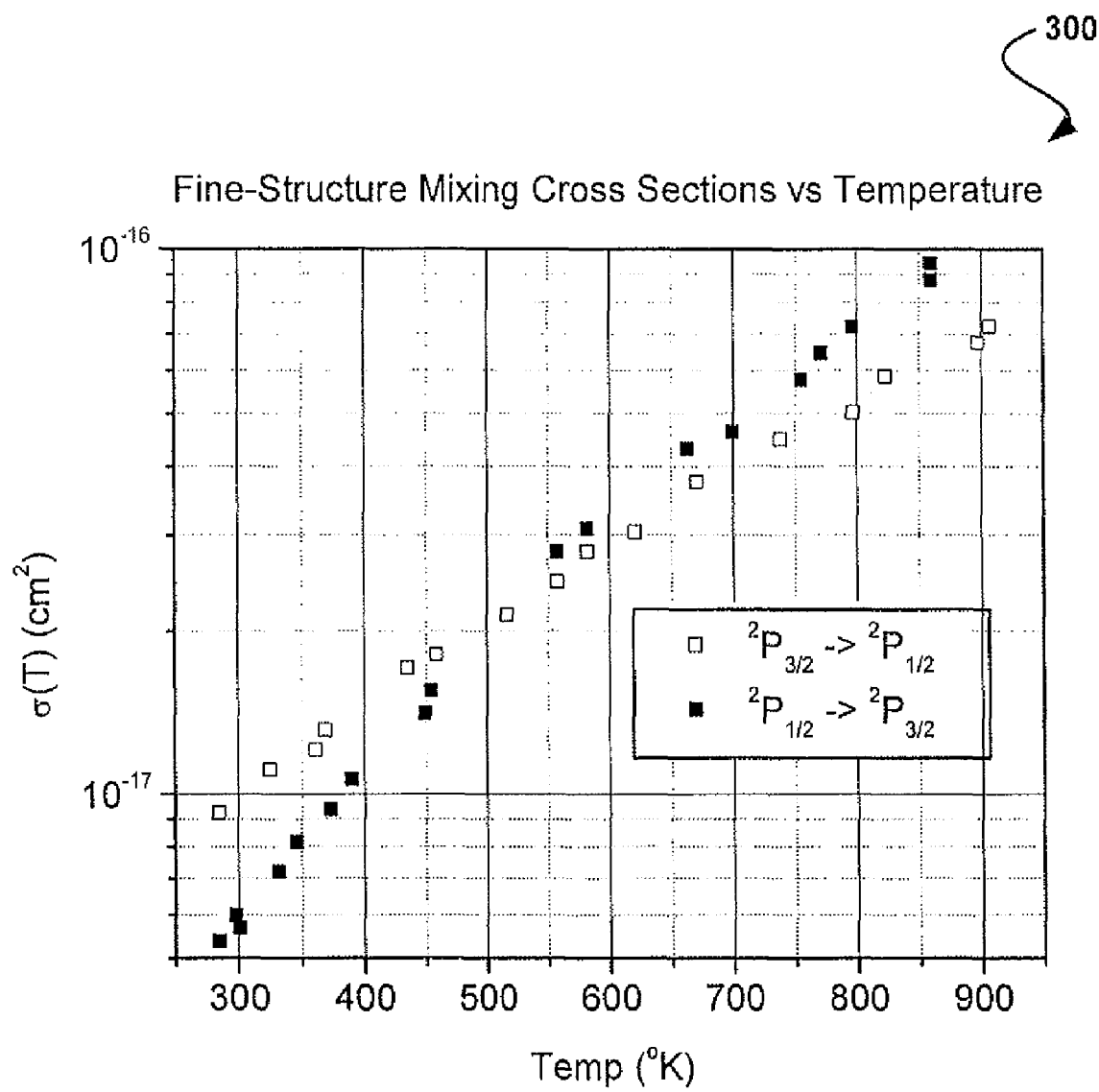
FIG. 3 shows fine-structure collisonal mixing cross sections for Rb with naturally occurring Helium (He) gas.
Figure 4:
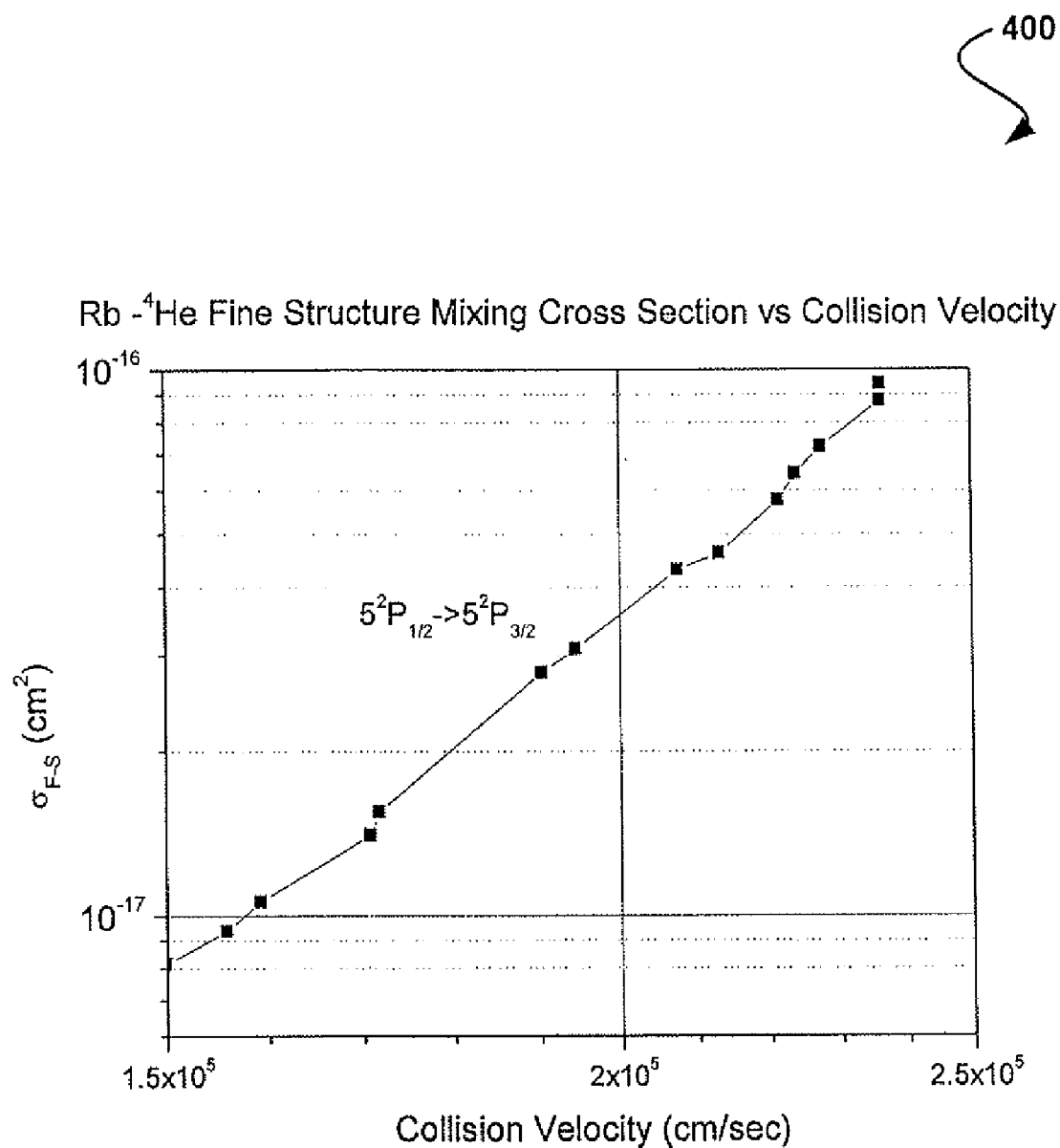
FIG. 4 shows a fine-structure mixing cross section of Rb and naturally occurring He versus collision velocity.

FIG. 3 shows fine-structure collisonal mixing cross sections for Rb with naturally occurring He gas. This plot is generated using data from a publication by Alan Gallagher in 1968, "Rb and Cs Excitation Transfer in nearly Adiabatic Collisions with Inert Gases," Phys Rev 88, 172 (1968). Examining FIG. 3, it is evident that the cross section value increases as temperature increases. In other words, the cross section values increase for higher thermal velocities. FIG. 4 shows the fine-structure mixing cross section of Rb and naturally occurring He versus collision velocity.

Considering an Rb laser with a cell temperature near 450° K (e.g. most Rb lasers will operate in this temperature vicinity), the fact that $^3$He atoms travel with thermal speeds larger than that of $^4$He atoms by a factor of 10.15 allows estimation of the $^3$He cross section values by assuming the $^3$He cross section value at a given temperature is equal to the $^4$He cross section value at $(1.15)^2$ times that temperature. In the present example, this temperature corresponds to 600 K. The square dependence of temperature on velocity follows from Equation 3, shown below.

$$\frac{1}{2} m \langle v^2 \rangle = \frac{3}{2} k_B T \qquad \text{Equation 3}$$

Figure 1:
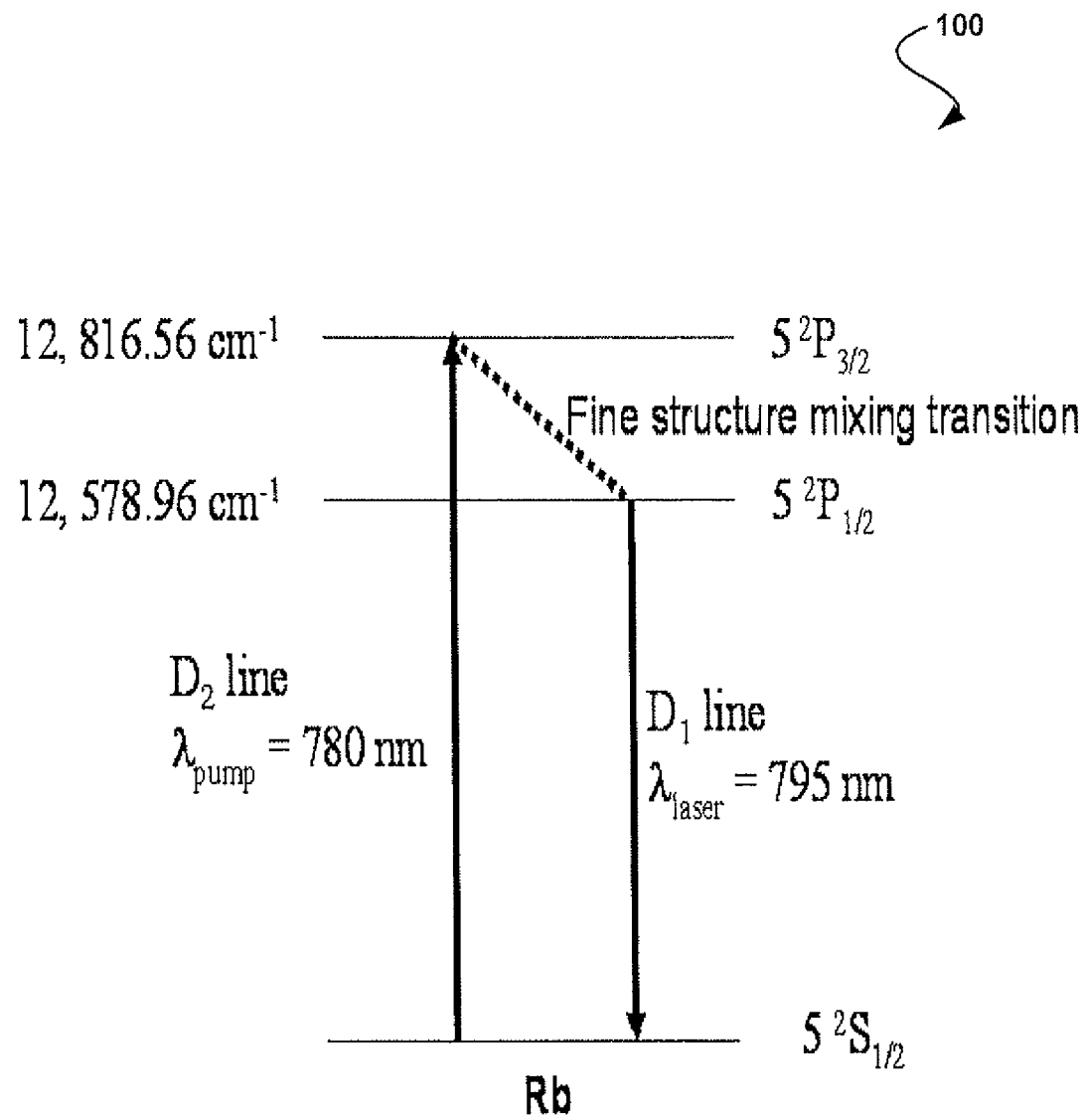
FIG. 1 shows energy levels involved in an optically pumped Rubidium (Rb) laser, in accordance with one alkali laser scheme.

Referring back to FIG. 1, this appears to insinuate that the $^2P_{3/2}$ to $^2P_{1/2}$ $^3$He cross section values are approximately 1.75 times larger than the corresponding $^4$He cross section values. In this case, it may be safely assumed that, except for the difference in the nuclear masses, the two isotopes of He behave identically in fine-structure-changing collisions with alkalis. Thus, the difference in thermally-averaged collision cross sections is due to the change in velocity, and not to any detail of nuclear spin, etc.

From further examination of Equation 1, it appears that, for a constant He pressure and a constant cell temperature, isotopically enriched $^3$He buffer gas gives approximately a 2.0 (1.15×1.75) times larger fine-structure mixing rate than naturally occurring He gas. From the perspective of a laser designer, this allows the use of He buffer gas pressures and densities that are 2.0 times smaller when using $^3$He than would be possible if using naturally occurring He gas instead of the $^3$He gas. This in turn reduces the dn/dT value in the laser cell using $^3$He by 2.0 times over what it would have been with naturally occurring He, giving the $^3$He-based system tremendous average-power-scaling advantages with respect to systems using naturally occurring He.

It should be noted that the thermal conductivity K of the $^3$He buffer gas is larger than that of naturally-occurring He gas by the same factor that the root-mean square (rms) thermal velocity of $^3$He is greater than that of $^4$He. In order to better compare an isotopically enriched $^3$He system with a $^4$He system, a FOM (figure of merit) that takes into account an OPD (optical path difference) across a laser aperture per unit power out of that aperture may be utilized. For example, Equation 4 defines a FOM, in accordance with one embodiment.

$$FOM = \frac{\Delta_{OPD}}{P_{out}} = \frac{dn}{dT} \frac{1}{4\pi\kappa} \frac{\eta_h}{\eta_{opt-opt}} \qquad \text{Equation 4}$$

Figure 5:
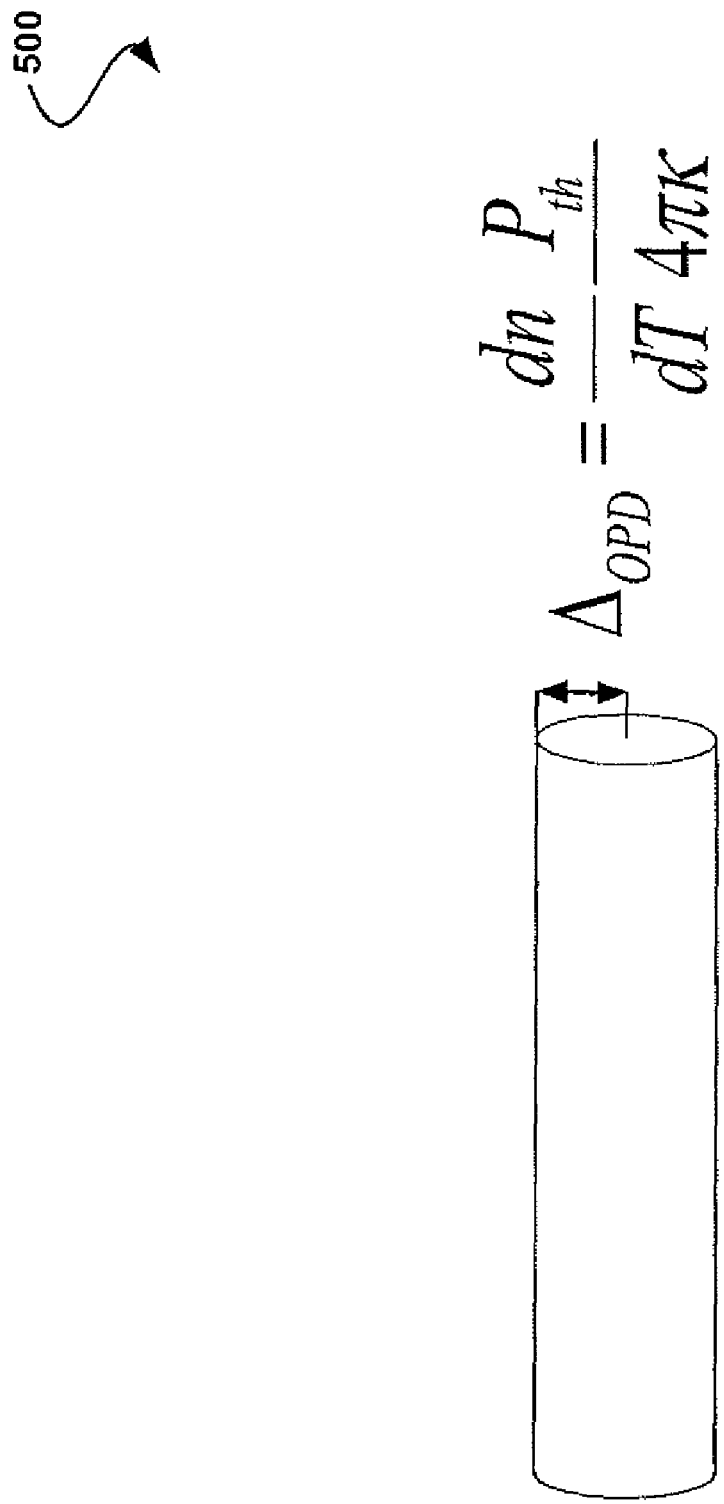
FIG. 5 shows an optical path difference (OPD) across a laser aperture as a function of thermal power dissipated by a laser, in accordance with one embodiment.

In this case, $\eta_h$ is the heat produced per unit of absorbed pump power, $\eta_{opt-opt}$ is the optical-optical efficiency of the laser, and κ is the thermal conductivity across the laser aperture. Furthermore, FIG. 5 shows the OPD across a laser aperture as a function of the thermal power dissipated by the laser, in accordance with one embodiment.

For the FOM defined in Equation 4, the smaller the resulting FOM the better. For constant temperature laser cells with equivalent fine-structure mixing rates, the FOM for a $^3$He based system compared to that for a $^4$He based system is 1:2.3. Based on this FOM, the $^3$He based system is 2.3 times (2.0×1.15) better than the same system using naturally occurring He gas.

The ability to go to lower He buffer gas pressures is particularly useful with the advent of line-narrowed laser diode arrays. Incorporating external optical elements into laser diode arrays such as volume Bragg gratings, or fabricating weak distributed Bragg gratings directly into laser diode bars, has made practical power scaled diode array pump sources with line widths under one nanometer. In such lasers, He buffer gas pressures as low as several atmospheres may be used to broaden the $D_2$ alkali absorption line sufficiently to permit good coupling of diode pump radiation to the alkali vapor. In such alkali lasers using line-narrowed laser diode arrays, the larger fine-structure mixing rates that result from using isotopically enriched $^3$He as opposed to naturally occurring He are particularly useful to enable enhanced laser performance.

Table 2 shows some selected physical parameters for Rb laser performance and a comparison between systems using $^3$He and $^4$He. In this case, the Rb—He fine-structure mixing cross section and the collisional broadening rate of the Rb $D_2$ line were determined experimentally.

TABLE 2

| Physical Parameter | Value for $^3$He/Value for $^4$He |
|---|---|
| Mean particle velocity | $\sqrt{4/3} \approx 1.15$ |
| Rb—He fine-structure mixing cross section | 1.5 at T = 142° C. |
| Fine-structure mixing rate | 1.7 |
| Thermal conductivity | $\sqrt{4/3}$ |
| Collisional broadening rate of Rb $D_2$ line | 1.15 |

Figure 6:
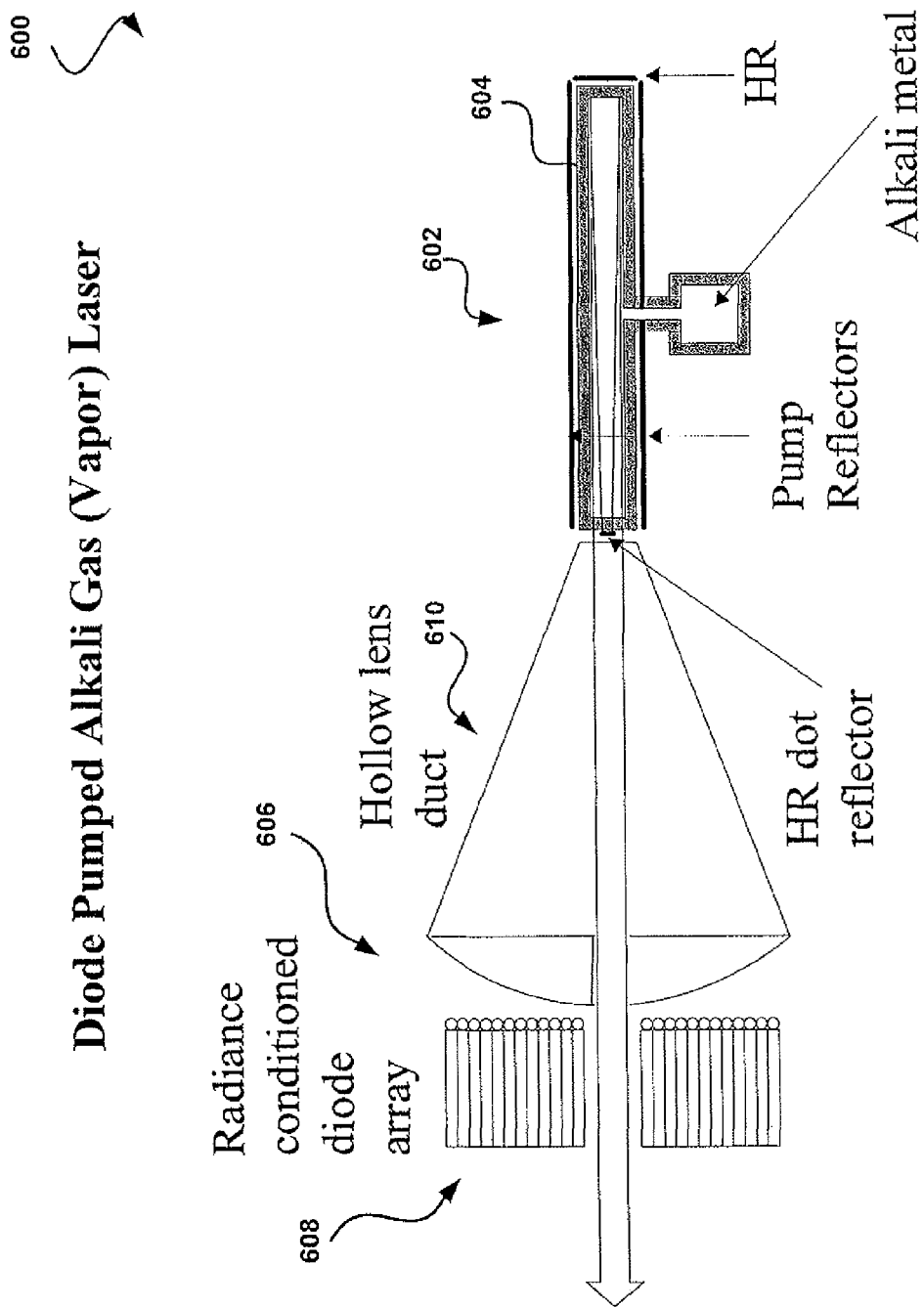
FIG. 6 shows an alkali vapor laser system, in accordance with one embodiment.

FIG. 6 shows an alkali vapor laser system 600, in accordance with one embodiment. As an option, the laser system 600 may be utilized in the context of the functionality and architecture of the previous figures. Of course, however, the laser system 600 may be implemented in any desired environment. It should also be noted that the aforementioned definitions may apply during the present description.

As shown, the laser system 600 includes an optical cavity 602. As shown further, the optical cavity 602 comprises a cell 604 including a gain medium with an alkali vapor and a buffer gas, the buffer gas including $^3$He gas. In this case, the $^3$He gas in the optical cavity 602 may provide an increased fine-structure mixing rate relative to a fine-structure mixing rate of naturally occurring He gas, if naturally occurring He gas was used in the optical cavity 602 instead of the $^3$He gas.

Additionally, atoms of the $^3$He gas in the optical cavity 602 will travel at a thermal velocity of about 1.15 times larger than that of naturally occurring He gas. As noted above, the $^3$He gas in the optical cavity 602 would provide about a 1.7 times larger fine-structure mixing rate than naturally occurring He gas, if naturally occurring He gas was used in the optical cavity 602 instead of the $^3$He gas. Furthermore, the $^3$He gas may be used to increase the thermal FOM (Equation 4) value in the laser system 600 by a factor of two, relative to the thermal FOM (Equation 4) value in the laser system 600 if naturally occurring He gas was used in the optical cavity 602 instead of the $^3$He gas.

It should be noted that, the amount of $^3$He gas included in the buffer gas may vary in different embodiments. For example, in one embodiment, if $^4$He gas is also present in the buffer gas, the ratio of the concentration of the $^3$He gas to the $^4$He gas may be greater than 1.37×10$^{-6}$. In another embodiment, if $^4$He gas is also present in the buffer gas, the ratio of the concentration of the $^3$He gas to the $^4$He gas may be greater than 0.001, 0.01, 0.1, etc.

As an option, the buffer gas may include at least 90% $^3$He gas. As another option, the buffer gas may include at least 99% $^3$He gas. Furthermore, in various embodiments, the alkali vapor may be selected from the group consisting of Cs, Rb, K, Sodium (Na), and Lithium (Li).

As shown further in FIG. 6, an optical excitation source 606 is provided, including a laser diode array 608 and pump delivery device 610. In one embodiment, the pump delivery device 610 may include a lens duct. In this case, the optical excitation source 606 may include a source at resonance with a $D_2$ transition of the alkali vapor. For example, in the case the alkali vapor consists of Rb, the optical excitation source 606 may include a source at resonance with a $D_2$ transition of the Rb.

In operation, the optical cavity 602 may be resonant at a first wavelength, corresponding to a wavelength of a $D_1$ transition of the alkali vapor. Furthermore, the excitation source 606 may be utilized for emitting pump radiation at a first wavelength, for optically pumping the gain medium at a wavelength of a $D_2$ transition of the alkali vapor to generate laser radiation emission output at a second wavelength.

As an option, the laser system 600 may be capable of being mode-locked. In this case, active and/or passive mode locking may be utilized. For example, in various embodiments, the mode-locking may include using an external signal to induce a modulation of intra-cavity radiation or using a device in the optical cavity 602 to produce a change in the intra-cavity radiation (e.g. a saturable absorber, etc.).

As another option, the laser system 600 may further include harmonic generation crystals for harmonically converting radiation output at a first frequency without the use of harmonic generation crystals, to radiation at a second frequency. In this case, the second frequency may be two, three, or four times the first frequency. In various embodiments, the harmonic generation crystals may be located within the optical cavity and/or outside of the optical cavity.

Additionally, in one embodiment, the laser system 600 may also include a flow loop comprising an entry port, an exit port, and a circulation device capable of circulating the alkali vapor and the buffer gas. In this case, the alkali vapor and $^3$He buffer gas may be contained in the flow loop such that a mixture of the alkali vapor and $^3$He buffer gas may be circulated. In this way, a heat exchanger may be utilized for moderating heat (e.g. adding or removing the heat) of the alkali vapor and the buffer gas to maintain a desired vapor pressure, as the mixture is circulated.

As an option, the laser system 600 may include a mechanism for minimizing density fluctuations in the gain medium. As another option, the laser system 600 may include a mechanism to produce a polarized buffer gas through spin exchange.

It should be noted that various other systems may implement the techniques and functionality as described above. For example, in one embodiment, an optical amplifier may comprise an optical cavity including a gain medium including an alkali vapor and a buffer gas, the buffer gas including $^3$He gas. Furthermore, the optical amplifier may be capable of outputting radiation at a first frequency.

In another embodiment, an apparatus may comprise a gain medium including an alkali vapor, and a buffer gas including $^3$He gas. In this case, the apparatus may include a cell (e.g. a vapor cell, etc.), a $^3$He filled fiber, photonic crystal, or other guide or resonator structure that contains optically excited Rb vapor as the active gain element.

Figure 7:
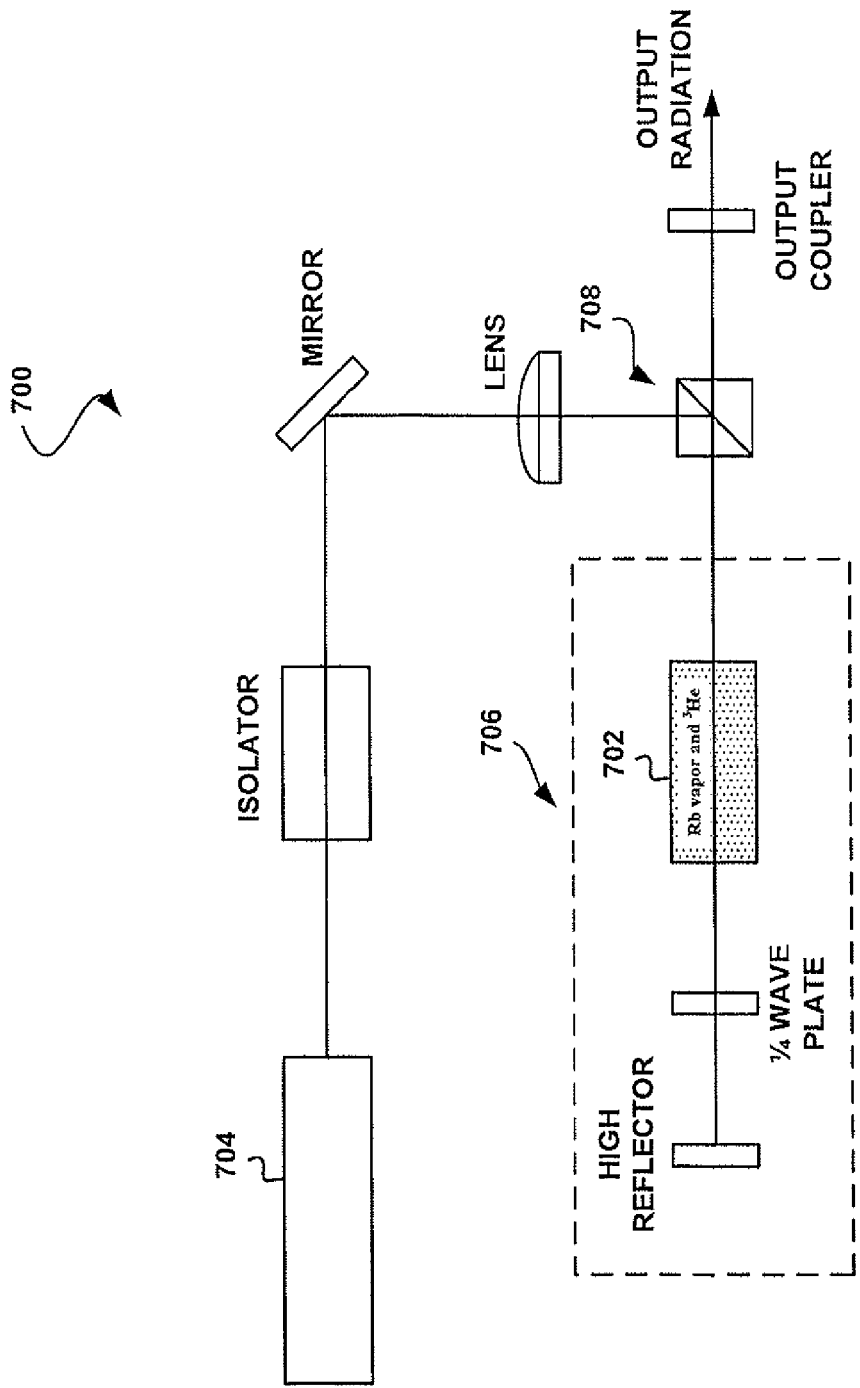
FIG. 7 shows an alkali vapor laser system, in accordance with another embodiment.

FIG. 7 shows an alkali vapor laser system 700, in accordance with another embodiment. As an option, the system 700 may be utilized in the context of the functionality and architecture of the previous figures. Of course, however, the system 700 may be implemented in any desired environment. It should also be noted that the aforementioned definitions may apply during the present description.

As shown, Rb vapor and $^3$He buffer gas are contained in a cylindrical ceramic cell 702 with sapphire windows that may be antireflection coated on their external surfaces and or internal surfaces. As one exemplary operation of the system 700, the Rb may be introduced into the cell as a pure metal, followed by cell evacuation using a vacuum system and by the introduction of 40 psi of $^3$He gas (2.7 atm) at room temperature (approximately 20° C.).

The $^3$He gas may be obtained from any suitable manufacturer. For example, Spectra Gases Inc. manufactures a $^3$He gas with a quoted 99.999% chemical purity and 99.9% isotopic enrichment. More information regarding the $^3$He gas provided by Spectra Gases Inc. may be found by contacting their headquarters located at: 3434 Route 22 West; Branchburg, N.J. 08876; USA.

With further reference to FIG. 7, the cell 702 may be placed in a close-fit copper oven with electric heaters that allow maintenance of the cell temperature in order to fix the resulting Rb saturated vapor pressure inside the cell 702. In one embodiment, a total pressure in the cell 702 is preferably, but not limited to, greater than 1 atm but less than 100 atm; more preferably, but not limited to, greater than 8 atm but less than 25 atm; and most preferably, but not limited to, between 10 atm and 12 atm.

As shown further, a pump source 704 is provided. In one embodiment, the pump source 704 may include a Ti:sapphire laser for providing linearly polarized, near-diffraction limited continuous-wave optical radiation. The pump light may be coupled into an optical laser cavity 706 via a polarizing beam splitter 708 and traversed through the vapor cell 702 twice by reflecting off a highly reflecting end mirror. In this case, a stable cavity mode may be formed using gain guiding, as instability may occur due to the nonuniform transverse gain profile over the length of the cell 702. Since the sapphire windows may be soldered onto the cell 702 with optic axes at unknown orientations, a quarter-wave plate may be placed in the cavity 706 to partially compensate for the polarization changes caused by birefringence. Using this system with $^3$He as a buffer gas, a high quality continuous-wave (cw) or quasi-cw beam may be outputted.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A laser oscillator, comprising:
an optical cavity including:
a gain medium including an alkali vapor and a buffer gas, the buffer gas including $^3$He gas and $^4$He gas, wherein a ratio of the concentration of the $^3$He gas to the $^4$He gas is greater than 0.001; and
an optical excitation source;
wherein the laser oscillator is capable of outputting radiation at a first frequency.

2. The laser oscillator of claim 1, wherein the alkali vapor includes Rb vapor.

3. The laser oscillator of claim 2, wherein the optical excitation source includes a source at resonance with a $D_2$ transition of the Rb vapor.

4. The laser oscillator of claim 1, wherein the optical excitation source includes a laser diode array and pump delivery device.

5. The laser oscillator of claim 1, wherein the laser oscillator is capable of being mode-locked.

6. The laser oscillator of claim 1, further comprising harmonic generation crystals for harmonically converting the radiation at the first frequency to radiation at a second frequency.

7. The laser oscillator of claim 6, wherein the second frequency is two, three, or four times the first frequency.

8. The laser oscillator of claim 1, further comprising a flow loop including:
an entry port;
an exit port; and
a circulation device.

9. The laser oscillator of claim 8, wherein the flow loop includes the alkali vapor and the buffer gas, wherein the flow loop circulates the alkali vapor and the buffer gas.

10. The laser oscillator of claim 9, further comprising a heat exchanger for moderating heat of the alkali vapor and the buffer gas to maintain a desired vapor pressure.

11. The laser oscillator of claim 10, further comprising a mechanism for minimizing density fluctuations in the gain medium.

12. The laser oscillator of claim 1, further comprising a mechanism to produce a polarized buffer gas through spin exchange.

13. The laser oscillator of claim 1, wherein the $^3$He gas in the optical cavity provides an increased fine-structure mixing rate relative to a fine-structure mixing rate of naturally occurring He gas if the naturally occurring He gas was used in the optical cavity instead of the $^3$He gas.

14. The laser oscillator of claim 1, wherein atoms of the $^3$He gas in the optical cavity travel at a thermal velocity of about 1.15 times larger than that of naturally occurring He gas.

15. The laser oscillator of claim 1, wherein the $^3$He gas in the optical cavity provides about a 1.7 times larger fine-structure mixing rate than naturally occurring He gas, if naturally occurring He gas was used in the optical cavity instead of the $^3$He gas.

16. The laser oscillator of claim 1, wherein the $^3$He gas broadens a D2 transition line of the alkali vapor.

17. A laser oscillator of claim 1, wherein a total pressure in a cell including the buffer gas and the alkali vapor is greater than 1 atm but less than 100 atm.

18. A laser oscillator, comprising:
an optical cavity including:
a gain medium including an alkali vapor and a buffer gas, the buffer gas including $^3$He gas and $^4$He gas, wherein a ratio of the concentration of the $^3$He gas to the $^4$He gas is greater than $1.37 \times 10^{-6}$; and
an optical excitation source;
wherein the laser oscillator is capable of outputting radiation at a first frequency,
wherein the buffer gas includes at least 90% $^3$He gas.

19. A laser oscillator, comprising:
an optical cavity including:
   a gain medium including an alkali vapor and a buffer gas, the buffer gas including $^3$He gas and $^4$He gas, wherein a ratio of the concentration of the $^3$He gas to the $^4$He gas is greater than $1.37 \times 10^{-6}$; and
   an optical excitation source;
wherein the laser oscillator is capable of outputting radiation at a first frequency,
wherein the buffer gas includes at least 99% $^3$He gas.

20. A method, comprising:
providing a gain medium including an alkali vapor for an optical cavity;
providing a buffer gas including $^3$He gas and $^4$He gas for the optical cavity, wherein a ratio of the concentration of the $^3$He gas to the $^4$He gas is greater than 0.001; and
providing an optical excitation source for emitting pump radiation at a first wavelength, for optically pumping the gain medium at a wavelength of a D2 transition of the alkali vapor to generate laser radiation emission output at a second wavelength.

21. An optical amplifier, comprising:
an optical cavity including:
   a gain medium including an alkali vapor and a buffer gas, the buffer gas including $^3$He gas and $^4$He gas, wherein a ratio of a concentration of the $^3$He gas to the $^4$He gas is greater than 0.001;
wherein the optical amplifier is capable of outputting radiation at a first frequency.

22. An apparatus, comprising:
an optical cavity including: a gain medium including an alkali vapor; and a buffer gas including $^3$He gas and $^4$He gas, wherein a ratio of a concentration of the $^3$He gas to the $^4$He gas is greater than 0.001; and
an optical excitation source;
wherein the apparatus is capable of outputting radiation at a first frequency.

23. The apparatus of claim 22, wherein the apparatus includes one of a cell, a $^3$He filled fiber, and a photonic crystal fiber.

* * * * *